UNITED STATES PATENT OFFICE.

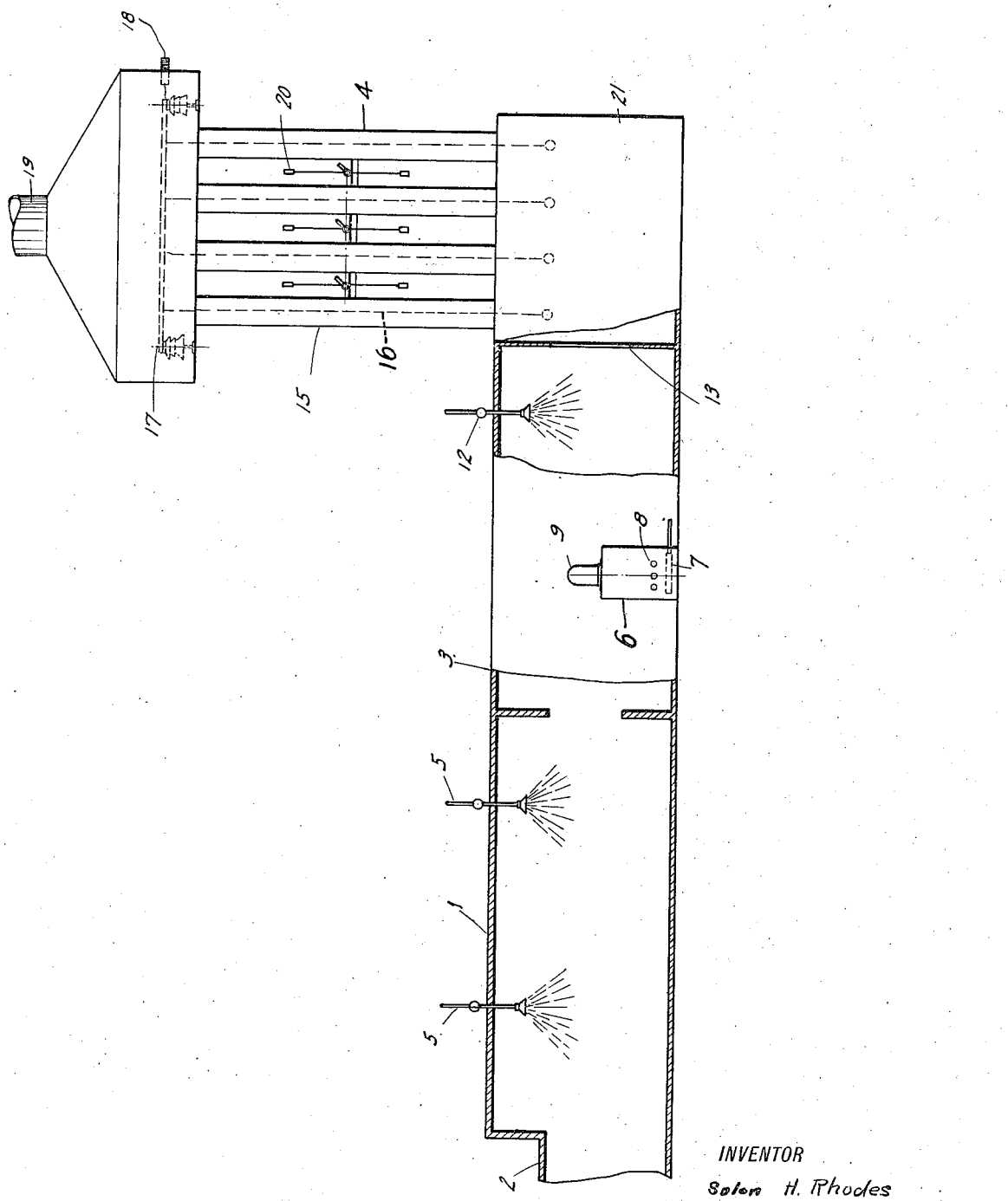

SOLON H. RHODES, OF RIVERSIDE, CALIFORNIA, ASSIGNOR TO INTERNATIONAL PRECIPITATION COMPANY, OF LOS ANGELES, CALIFORNIA, A CORPORATION OF CALIFORNIA.

PROCESS AND APPARATUS FOR ELECTRICAL SEPARATION OF SUSPENDED PARTICLES FROM GASES.

1,413,993.

Specification of Letters Patent. Patented Apr. 25, 1922.

Application filed June 19, 1919. Serial No. 305,404.

*To all whom it may concern:*

Be it known that I, SOLON H. RHODES, a citizen of the United States, residing at Riverside, in the county of Riverside and State of California, have invented a new and useful Process and Apparatus for Electrical Separation of Suspended Particles from Gases, of which the following is a specification.

This invention relates to the art of removing suspended material from gases by electrical action, and the main object of the invention is to provide for efficient operation of processes of this kind in cases where the suspended material is of such nature as to interfere with effective precipitation, for example, by reason of its lack of conductivity interfering with the maintenance of an effective precipitating field.

In cases of this kind, successful precipitation has, in some cases, been assisted by the use of water, applied in the form of spray or otherwise in such manner as to humidify the gases and to cause the precipitate to be deposited with sufficient water retained in or on the same to render the deposit conducting to the extent required for successful operation; in some cases, however, for example, arsenic bearing fumes, it is difficult to provide for effective precipitation by the use of water alone and, in such cases, I have found that by the use of carbon smoke it is possible to control the conductivity or nature of the precipitated material so as to favorably affect the precipitating action.

I have also found that in some cases it is desirable to use water sprays or humidifying means in addition to the smoke to further increase the efficiency of precipitation. My invention is based on the above discoveries.

The accompanying drawing illustrates an apparatus suitable for carrying out my invention, said drawing being a partly sectional side elevation of such an apparatus.

Referring to the drawing, a chamber or flue 1 adapted to receive the gases to be treated is connected at one end to the inlet flue 2 for such gases and at the other end to a chamber 3 having an outlet connection to an electrical precipitator 4. Suitable means, such as spray pipes 5, may be provided in the chamber 1. A smoke producing means, for example, a furnace 6, may have an outlet connection 9 to the chamber 3, said furnace being adapted for the combustion of oil, or other suitable fuel, and provided with burner means 7 and with air inlet means 8 regulable to provide for incomplete combustion of the fuel with consequent production of carbon smoke, which is discharged through outlet 9 into the chamber 3.

A water spray or humidifying means 12 may also be provided in chamber 3 between the smoke inlet 9 and the outlet 13 leading to the electrical precipitator.

Electrical precipitator 4 may be of any suitable or usual construction, comprising, for example, vertical pipes 15 acting as collecting electrodes and wires 16 acting as discharge electrodes, said discharge electrodes being mounted on insulated frame 17 connected by wire 18 to suitable means for supplying high potential electric current, for example, as set forth in the patent to F. G. Cottrell, dated August 11th, 1908, No. 895,729.

The electrical precipitator 4 may be provided with outlet means or stack 19 for conducting away the cleaned gases. Suitable hammer means 20 may be provided for knocking the collecting electrode pipes 15 to dislodge the precipitated material from the interior thereof, said material falling into the lower header 21 of the precipitator and being removed therefrom continuously or intermittently, as required, by any suitable means.

My process may be carried out as follows:

The gases to be treated (and carrying suspended material, for example, arsenic fumes,) are passed from the inlet flue 2 through the chamber or flue 1 wherein they are subjected to humidfying action by the spray means 5 and then passed into the chamber or flue 3 in which carbon smoke, such as oil smoke, is passed from the smoke producing means 6 and the gases are then passed to the electrical precipitator being subjected, if desired, to further water spraying action by means 12. In passing through the electrical precipitator 4 the gases are subjected to the action of an electric field between the discharge electrodes 16 and the collecting electrodes 15 with the result that the suspended particles are precipitated on the collecting electrodes and by reason of the presence of the carbon smoke in the gases and precipitation of the carbon smoke particles along with the other suspended particles, the resulting deposit on the collecting electrodes is rendered of such nature as to provide for effective precipitation. It has been found that where the precipitated material is of a highly non-conducting nature there is a tendency to accumulation of electric charge on the deposit, resulting in local ionization and eventual breaking down of the dielectric, so that effective potential difference cannot be maintained in the precipitator; but that by rendering the deposit conducting this objectionable action can be eliminated and full voltage maintained with resultant effective precipitation. One effect of the carbon smoke or oil smoke precipitated with the other suspended material is to increase the conductivity thereof and the moisture condensed, precipitated, or otherwise formed on the deposit, also has a similar effect, and, in some cases, it is desirable to use both of these conducting media concurrently; in such cases, the water may be added to the gases either before the smoke is distributed into the same or after, or both before and after, by suitable manipulation of the valves for the water spraying means 5 and 12. It will also be understood that in the place of water any aqueous solution may be used, suitable for the process in hand, or, if desired, steam may be used in place of, or together, with water.

In some cases, the gases, which are to be subjected to treatment, are already sufficiently humidified and, in such cases, the operation of the sprays 5 and 12 may be omitted; in other cases, the deposit may be made sufficiently conducting by carbon smoke alone without the use of any humidification. In this connection, it may be stated that by the use of carbon smoke sufficient conductivity may be imparted to the deposit, in some cases, even when the precipitated material is at a high temperature, for example, a temperature so far above 100° C. that water could not be used as a conductivity increasing agent.

What I claim is:

1. The process of separating suspended particles, from gases, which consists in distributing carbon smoke into such gases, and then subjecting the gases to the action of an electrical field in such manner as to precipitate the smoke together with the other material originally suspended in the gases.

2. The process, as set forth in claim 1, and comprising, in addition, humidifying the gases to further control the nature of the deposit.

3. In the art of electrical separation of suspended particles from gases, the process which consists in adding smoke to the gases containing suspended material, and then precipitating such smoke together with the other suspended material, by electrical action.

4. An apparatus for electrical precipitation of suspended material from gases, comprising an electrical precipitator, gas conducting means adapted to receive the gases to be treated and to conduct same to the electrical means for producing carbon smoke and for admitting such smoke into said gas conducting means.

5. An apparatus, as set forth in claim 4, comprising, in addition, means for supplying water to said gas conducting means.

In testimony whereof I have hereunto subscribed my name this 17th day of June, 1919.

SOLON H. RHODES.